US011457239B2

(12) United States Patent
Alakuijala et al.

(10) Patent No.: US 11,457,239 B2
(45) Date of Patent: Sep. 27, 2022

(54) BLOCK ARTEFACT REDUCTION

(71) Applicant: GOOGLE LLC, Mountain View, CA (US)

(72) Inventors: Jyrki Alakuijala, Wollerau (SZ); Zoltan Szabadka, Wollerau (CH)

(73) Assignee: GOOGLE LLC, Mountain View, CA (US)

( * ) Notice: Subject to any disclaimer, the term of this patent is extended or adjusted under 35 U.S.C. 154(b) by 1022 days.

(21) Appl. No.: 15/807,622

(22) Filed: Nov. 9, 2017

(65) Prior Publication Data

US 2019/0141351 A1 May 9, 2019

(51) Int. Cl.
*H04N 11/02* (2006.01)
*H04N 19/597* (2014.01)
(Continued)

(52) U.S. Cl.
CPC ......... *H04N 19/597* (2014.11); *H04N 19/117* (2014.11); *H04N 19/124* (2014.11);
(Continued)

(58) Field of Classification Search
CPC .. H04N 19/597; H04N 19/117; H04N 19/124; H04N 19/13; H04N 19/14;
(Continued)

(56) References Cited

U.S. PATENT DOCUMENTS 5,684,544 A 11/1997 Astle
7,145,953 B2 12/2006 Park et al.
(Continued)

FOREIGN PATENT DOCUMENTS

CN 105306959 A 2/2016
EP 2192786 A1 6/2010
(Continued)

OTHER PUBLICATIONS

Bankoski, et al., "Technical Overview of VP8, An Open Source Video Codec for the Web", Jul. 11, 2011, 6 pp.
(Continued)

*Primary Examiner* — Jayanti K Patel
*Assistant Examiner* — Richard B Carter
(74) *Attorney, Agent, or Firm* — Young Basile Hanlon & MacFarlane, P.C.

(57) ABSTRACT

Video decoding may include transform coefficient continuity smoothing, which may include coefficient continuity smoothing, defined correlation coefficient smoothing, pixel range projection, and luminance correlated chrominance resampling. Coefficient continuity smoothing may include obtaining encoded block data from the encoded bitstream, the encoded block data corresponding to a current block from the reconstructed frame, and generating reconstructed block data for the current block based on the encoded block data using transform coefficient continuity smoothing. Transform coefficient continuity smoothing may include, for a block boundary of the current block, in response to a determination that adjacent block data corresponding to an adjacent block spatially adjacent to the current block along the block boundary is available, performing transform coefficient continuity smoothing based on the current block, the adjacent block, and the block boundary, and including the reconstructed block data in the reconstructed frame, and outputting the reconstructed frame.

20 Claims, 12 Drawing Sheets

(51) Int. Cl.

| | |
|---|---|
| *H04N 19/44* | (2014.01) |
| *H04N 19/176* | (2014.01) |
| *H04N 19/13* | (2014.01) |
| *H04N 19/124* | (2014.01) |
| *H04N 19/61* | (2014.01) |
| *H04N 19/82* | (2014.01) |
| *H04N 19/18* | (2014.01) |
| *H04N 19/117* | (2014.01) |
| *H04N 19/14* | (2014.01) |
| *H04N 19/167* | (2014.01) |
| *H04N 19/60* | (2014.01) |
| *H04N 19/86* | (2014.01) |

(52) U.S. Cl.
CPC ............ *H04N 19/13* (2014.11); *H04N 19/14* (2014.11); *H04N 19/167* (2014.11); *H04N 19/176* (2014.11); *H04N 19/18* (2014.11); *H04N 19/44* (2014.11); *H04N 19/60* (2014.11); *H04N 19/61* (2014.11); *H04N 19/82* (2014.11); *H04N 19/86* (2014.11)

(58) Field of Classification Search
CPC .... H04N 19/167; H04N 19/176; H04N 19/18; H04N 19/44; H04N 19/60; H04N 19/61; H04N 19/82; H04N 19/86
USPC .......................... 375/240.02, 240.12; 382/232
See application file for complete search history.

(56) References Cited

U.S. PATENT DOCUMENTS

| | | | |
|---|---|---|---|
| 8,369,649 B2 | 2/2013 | Nagumo | |
| 8,908,760 B2 | 12/2014 | Jeon et al. | |
| 9,509,990 B2 | 11/2016 | Rossato et al. | |
| 9,538,203 B2 | 1/2017 | Park et al. | |
| 2003/0222998 A1 | 12/2003 | Yamauchi et al. | |
| 2009/0080798 A1 | 3/2009 | Maurer et al. | |
| 2012/0177298 A1* | 7/2012 | Fujino ...................... | H04N 1/41 382/232 |
| 2012/0195379 A1* | 8/2012 | Alshin ................... | H04N 19/61 375/240.12 |
| 2014/0146875 A1 | 5/2014 | Chong et al. | |
| 2017/0230670 A1* | 8/2017 | Kim ...................... | H04N 19/159 |
| 2017/0230671 A1* | 8/2017 | Kim ...................... | H04N 19/159 |
| 2017/0280163 A1* | 9/2017 | Kao ........................ | H04N 19/61 |

FOREIGN PATENT DOCUMENTS

| | | |
|---|---|---|
| EP | 3195597 A1 | 7/2017 |
| WO | 2014132096 A1 | 9/2014 |

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video. Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

International Search Report and Written Opinion in PCT/US2018/046449, dated Oct. 26, 2018, 17 pgs.

Tao Chen et al., "Adaptive Postfiltering of Transform Coefficients for the Reduction of Blocking Artifacts", IEEE Transactions on Circuits and Systems for Video Technology, IEEE, vol. 11, No. 5 (May 2001), pp. 594-602.

\* cited by examiner

TOP 1D COEFFICIENTS $a_{(0,0)} + a_{(1,0)} + a_{(2,0)} + a_{(3,0)} + a_{(4,0)} + a_{(5,0)} + a_{(6,0)} + a_{(7,0)}$ | $a_{(0,1)} + a_{(1,1)} + a_{(2,1)} + a_{(3,1)} + a_{(4,1)} + a_{(5,1)} + a_{(6,1)} + a_{(7,1)}$ | $a_{(0,2)} + a_{(1,2)} + a_{(2,2)} + a_{(3,2)} + a_{(4,2)} + a_{(5,2)} + a_{(6,2)} + a_{(7,2)}$ | $a_{(0,3)} + a_{(1,3)} + a_{(2,3)} + a_{(3,3)} + a_{(4,3)} + a_{(5,3)} + a_{(6,3)} + a_{(7,3)}$ | $a_{(0,4)} + a_{(1,4)} + a_{(2,4)} + a_{(3,4)} + a_{(4,4)} + a_{(5,4)} + a_{(6,4)} + a_{(7,4)}$ | $a_{(0,5)} + a_{(1,5)} + a_{(2,5)} + a_{(3,5)} + a_{(4,5)} + a_{(5,5)} + a_{(6,5)} + a_{(7,5)}$ | $a_{(0,6)} + a_{(1,6)} + a_{(2,6)} + a_{(3,6)} + a_{(4,6)} + a_{(5,6)} + a_{(6,6)} + a_{(7,6)}$ | $a_{(0,7)} + a_{(1,7)} + a_{(2,7)} + a_{(3,7)} + a_{(4,7)} + a_{(5,7)} + a_{(6,7)} + a_{(7,7)}$

732 ... 730

| $a_{(0,0)}$ | $a_{(0,1)}$ | $a_{(0,2)}$ | $a_{(0,3)}$ | $a_{(0,4)}$ | $a_{(0,5)}$ | $a_{(0,6)}$ | $a_{(0,7)}$ |
|---|---|---|---|---|---|---|---|
| $a_{(1,0)}$ | $a_{(1,1)}$ | $a_{(1,2)}$ | $a_{(1,3)}$ | $a_{(1,4)}$ | $a_{(1,5)}$ | $a_{(1,6)}$ | $a_{(1,7)}$ |
| $a_{(2,0)}$ | $a_{(2,1)}$ | $a_{(2,2)}$ | $a_{(2,3)}$ | $a_{(2,4)}$ | $a_{(2,5)}$ | $a_{(2,6)}$ | $a_{(2,7)}$ |
| $a_{(3,0)}$ | $a_{(3,1)}$ | $a_{(3,2)}$ | $a_{(3,3)}$ | $a_{(3,4)}$ | $a_{(3,5)}$ | $a_{(3,6)}$ | $a_{(3,7)}$ |
| $a_{(4,0)}$ | $a_{(4,1)}$ | $a_{(4,2)}$ | $a_{(4,3)}$ | $a_{(4,4)}$ | $a_{(4,5)}$ | $a_{(4,6)}$ | $a_{(4,7)}$ |
| $a_{(5,0)}$ | $a_{(5,1)}$ | $a_{(5,2)}$ | $a_{(5,3)}$ | $a_{(5,4)}$ | $a_{(5,5)}$ | $a_{(5,6)}$ | $a_{(5,7)}$ |
| $a_{(6,0)}$ | $a_{(6,1)}$ | $a_{(6,2)}$ | $a_{(6,3)}$ | $a_{(6,4)}$ | $a_{(6,5)}$ | $a_{(6,6)}$ | $a_{(6,7)}$ |
| $a_{(7,0)}$ | $a_{(7,1)}$ | $a_{(7,2)}$ | $a_{(7,3)}$ | $a_{(7,4)}$ | $a_{(7,5)}$ | $a_{(7,6)}$ | $a_{(7,7)}$ |

700

2D TRANSFORM COEFFICIENTS

FIG. 9

2D TRANSFORM COEFFICIENTS — 700

| $a_{(0,0)}$ | $a_{(0,1)}$ | $a_{(0,2)}$ | $a_{(0,3)}$ | $a_{(0,4)}$ | $a_{(0,5)}$ | $a_{(0,6)}$ | $a_{(0,7)}$ |
|---|---|---|---|---|---|---|---|
| $a_{(1,0)}$ | $a_{(1,1)}$ | $a_{(1,2)}$ | $a_{(1,3)}$ | $a_{(1,4)}$ | $a_{(1,5)}$ | $a_{(1,6)}$ | $a_{(1,7)}$ |
| $a_{(2,0)}$ | $a_{(2,1)}$ | $a_{(2,2)}$ | $a_{(2,3)}$ | $a_{(2,4)}$ | $a_{(2,5)}$ | $a_{(2,6)}$ | $a_{(2,7)}$ |
| $a_{(3,0)}$ | $a_{(3,1)}$ | $a_{(3,2)}$ | $a_{(3,3)}$ | $a_{(3,4)}$ | $a_{(3,5)}$ | $a_{(3,6)}$ | $a_{(3,7)}$ |
| $a_{(4,0)}$ | $a_{(4,1)}$ | $a_{(4,2)}$ | $a_{(4,3)}$ | $a_{(4,4)}$ | $a_{(4,5)}$ | $a_{(4,6)}$ | $a_{(4,7)}$ |
| $a_{(5,0)}$ | $a_{(5,1)}$ | $a_{(5,2)}$ | $a_{(5,3)}$ | $a_{(5,4)}$ | $a_{(5,5)}$ | $a_{(5,6)}$ | $a_{(5,7)}$ |
| $a_{(6,0)}$ | $a_{(6,1)}$ | $a_{(6,2)}$ | $a_{(6,3)}$ | $a_{(6,4)}$ | $a_{(6,5)}$ | $a_{(6,6)}$ | $a_{(6,7)}$ |
| $a_{(7,0)}$ | $a_{(7,1)}$ | $a_{(7,2)}$ | $a_{(7,3)}$ | $a_{(7,4)}$ | $a_{(7,5)}$ | $a_{(7,6)}$ | $a_{(7,7)}$ |

742 — 740

$$a_{(0,i)} - a_{(1,i)} + a_{(2,i)} - a_{(3,i)} + a_{(4,i)} - a_{(5,i)} + a_{(6,i)} - a_{(7,i)}$$

for $i = 0, 1, 2, 3, 4, 5, 6, 7$

BOTTOM 1D COEFFICIENTS

FIG. 10

BLOCK ARTEFACT REDUCTION

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using block artefact reduction.

SUMMARY

This application relates to encoding and decoding of image data, video stream data, or both for transmission or storage. Disclosed herein are aspects of systems, methods, and apparatuses for encoding and decoding using block artefact reduction.

An aspect is a method for video decoding comprising generating, by a processor executing instructions stored on a non-transitory computer-readable medium, a reconstructed frame by decoding an encoded bitstream by obtaining encoded block data from the encoded bitstream, the encoded block data corresponding to a current block from the reconstructed frame, generating reconstructed block data for the current block based on the encoded block data using transform coefficient continuity smoothing, and outputting the reconstructed frame. Transform coefficient continuity smoothing includes, for a block boundary of the current block, in response to a determination that adjacent block data corresponding to an adjacent block spatially adjacent to the current block along the block boundary is available, performing transform coefficient continuity smoothing based on the current block, the adjacent block, and the block boundary, and including the reconstructed block data in the reconstructed frame.

Another aspect is an apparatus, including a decoder, including a non-transitory computer-readable memory including instructions for generating a reconstructed frame by decoding an encoded bitstream, and a processor, operatively coupled to the non-transitory computer-readable memory, for receiving the instructions from the non-transitory computer-readable memory and executing the instructions to obtain encoded block data from the encoded bitstream, the encoded block data corresponding to a current block from the reconstructed frame, generate reconstructed block data for the current block based on the encoded block data using transform coefficient continuity smoothing, include the reconstructed block data in the reconstructed frame, and output the reconstructed frame. The processor configured to perform transform coefficient continuity smoothing by, for a block boundary of the current block, in response to a determination that adjacent block data corresponding to an adjacent block spatially adjacent to the current block along the block boundary is available, performing transform coefficient continuity smoothing based on the current block, the adjacent block, and the block boundary.

Another aspect is a method for video decoding comprising generating, by a processor executing instructions stored on a non-transitory computer-readable medium, a reconstructed frame by decoding an encoded bitstream by obtaining encoded block data from the encoded bitstream, the encoded block data corresponding to a current block from the reconstructed frame and including two-dimensional transform coefficients for the current block, generating reconstructed block data for the current block based on the encoded block data using transform coefficient continuity smoothing, including the reconstructed block data in the reconstructed frame, and outputting the reconstructed frame. Transform coefficient continuity smoothing includes, for a block boundary of the current block, in response to a determination that adjacent block data corresponding to an adjacent block spatially adjacent to the current block along the block boundary is available, performing transform coefficient continuity smoothing based on the current block, the adjacent block, and the block boundary. Performing transform coefficient continuity smoothing based on the current block and the adjacent block includes determining one-dimensional transform coefficients for the current block based on the block boundary and the two-dimensional transform coefficients for the current block, and determining intermediate two-dimensional transform coefficients for the current block based on the two-dimensional transform coefficients for the current block and a difference between the one-dimensional transform coefficients for the current block and one-dimensional transform coefficients for the adjacent block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 9 is a block diagram of a representation of the two-dimensional transform coefficients and generating corresponding top one-dimensional transform coefficients for decoding a block of a frame in accordance with implementations of this disclosure.

FIG. 10 is a block diagram of a representation of the two-dimensional transform coefficients and generating corresponding bottom one-dimensional transform coefficients for decoding a block of a frame in accordance with implementations of this disclosure.

DETAILED DESCRIPTION

Image and video compression schemes may include breaking an image, or frame, into smaller portions, such as blocks, and generating an output bitstream using techniques to limit the information included for each block in the output. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame. The residual information may be further compressed by transforming the residual information into transform coefficients, quantizing the transform coefficients, and entropy coding the quantized transform coefficients.

An encoded bitstream can be decoded to recreate the blocks and the source images from the limited information. A decoded frame may include artifacts, such as blocky artifacts that cross block boundaries caused by quantization.

Video coding using block artefact reduction may improve accuracy and decoding quality using transform coefficient continuity smoothing, defined correlation coefficient smoothing, pixel range projection, luminance correlated chrominance resampling, or a combination thereof. Transform coefficient continuity smoothing may include generating one-dimensional transform coefficients based on two-dimensional transform coefficients, determining differences among spatially adjacent one-dimensional transform coefficients corresponding to a block boundary, and adjusting the two-dimensional transform coefficients based on the differences. Defined correlation coefficient smoothing may include adjusting the two-dimensional transform coefficients based on defined correlations between low frequency coefficients and respective corresponding next overtone coefficients. Pixel range projection may include inverse transforming the transform coefficients to generate pixel data, adjusting the pixel data based on defined value ranges, transforming the adjusted pixel values to generate limited range transform coefficients, adjusting the limited range transform coefficients based on compressed value ranges and within smoothing constraints to generate pixel range projection adjusted transform coefficients, which may be inverse transformed to generate reconstructed pixel values. Luminance correlated chrominance resampling may include down-sampling luminance channel data, identifying correlations among neighboring down-sampled luminance values, and using the correlations to up-sample corresponding chrominance data.

Figure 1:
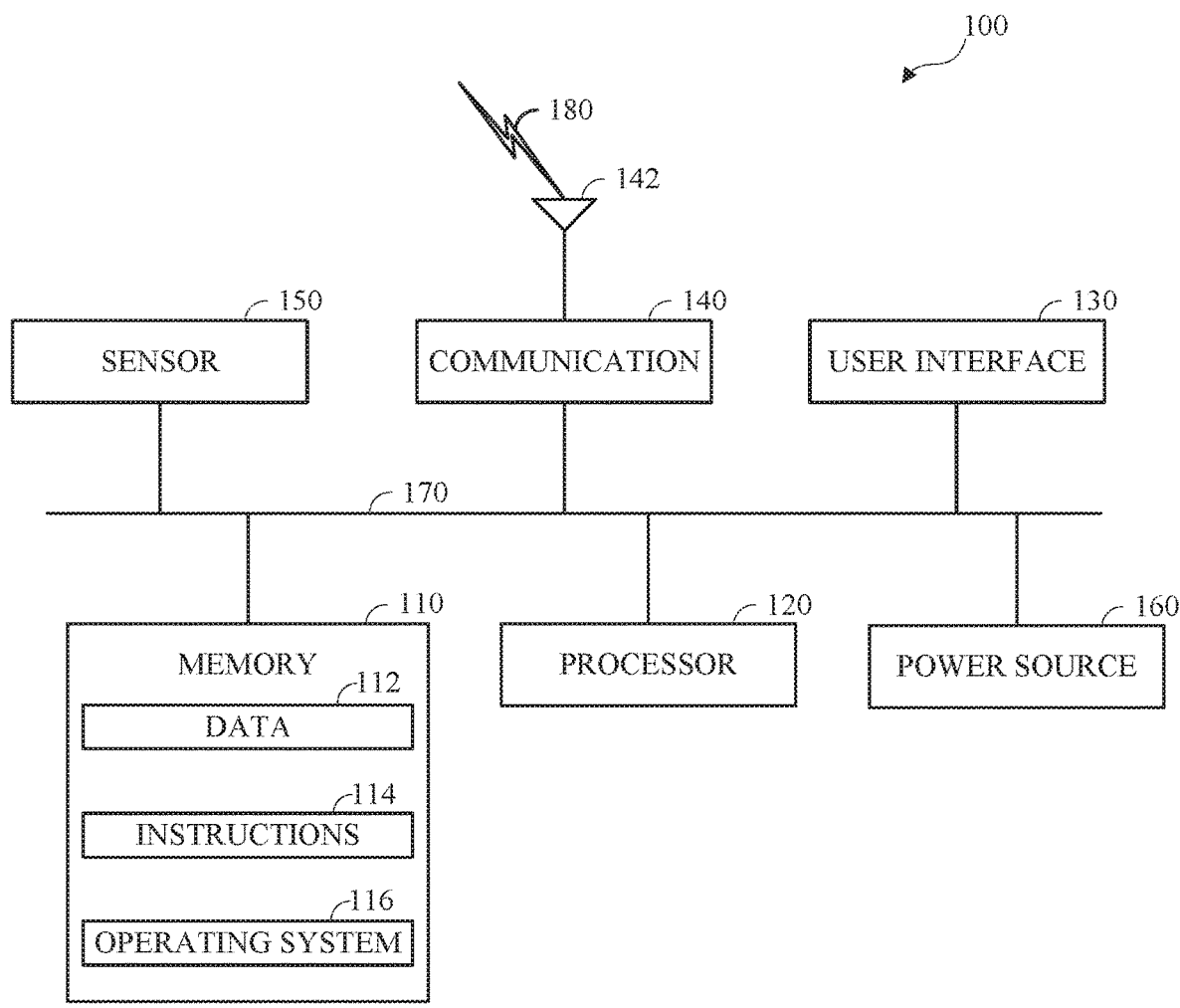
FIG. 1 is a diagram of a computing device in accordance with implementations of this disclosure.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
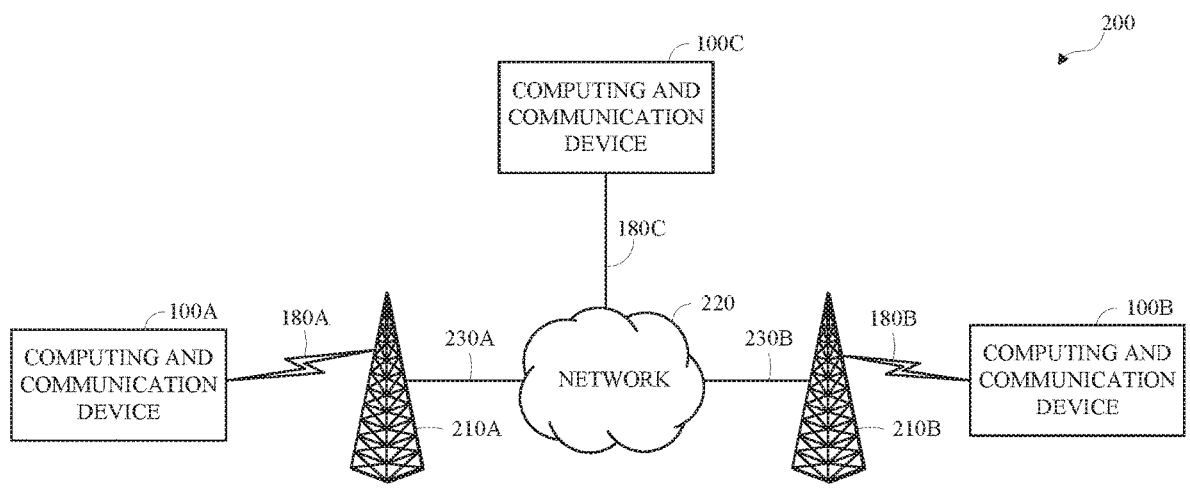
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
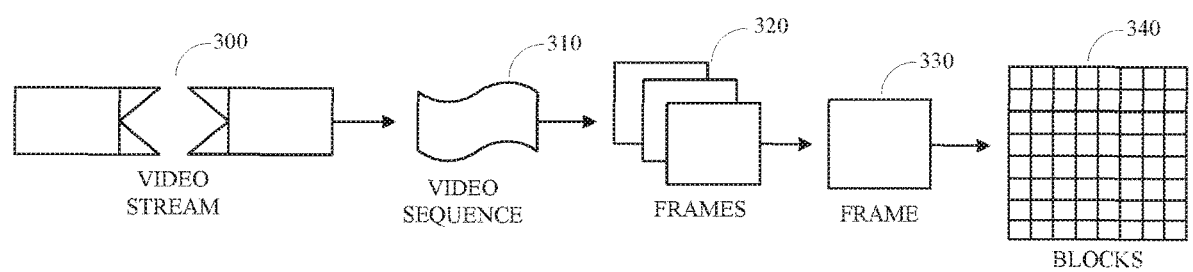
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
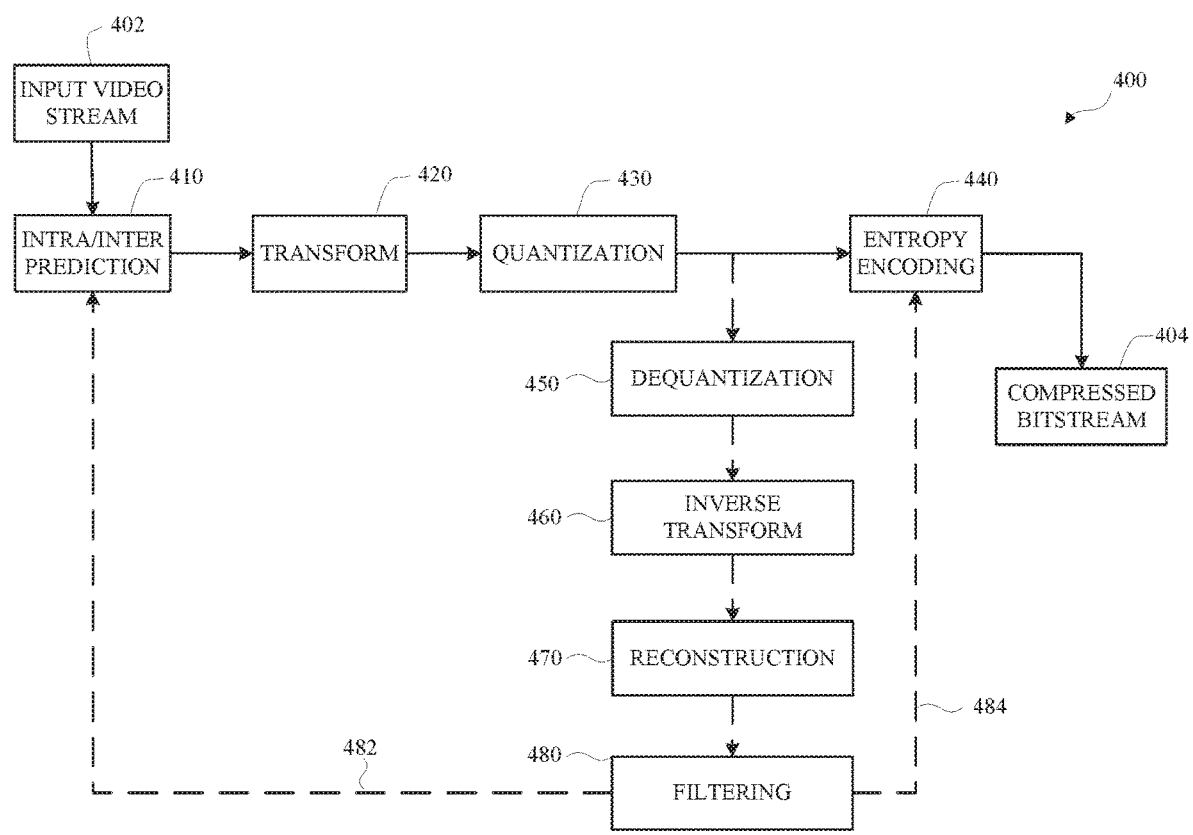
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
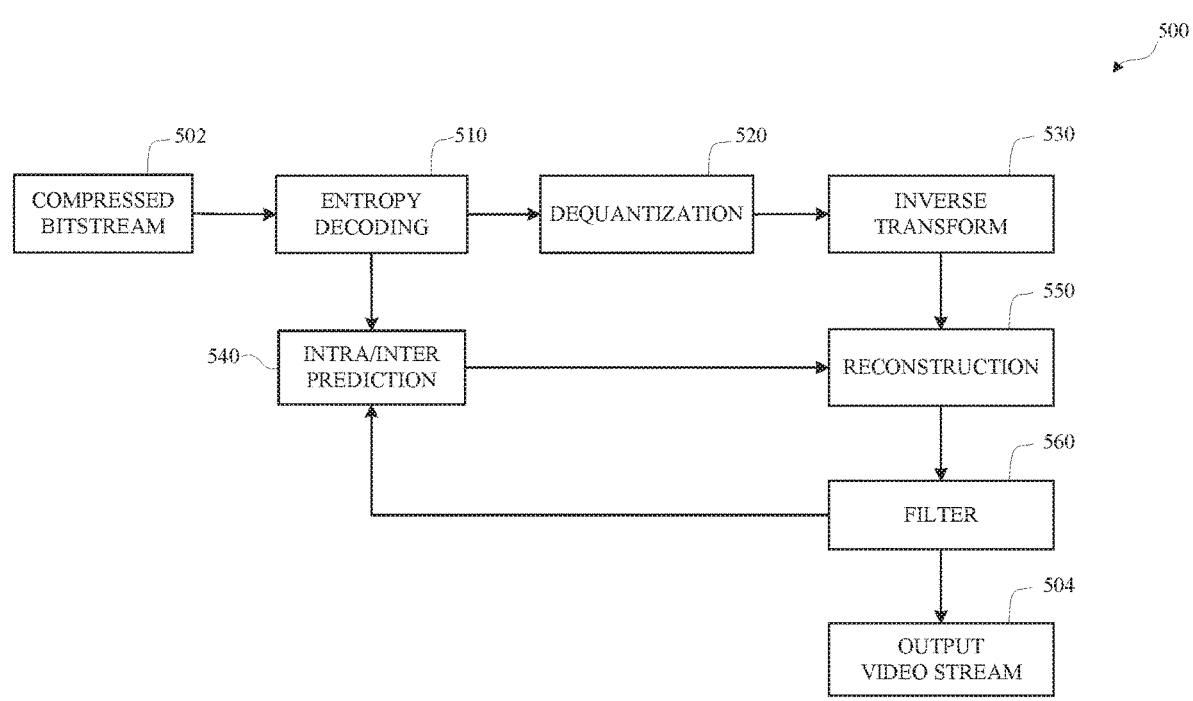
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
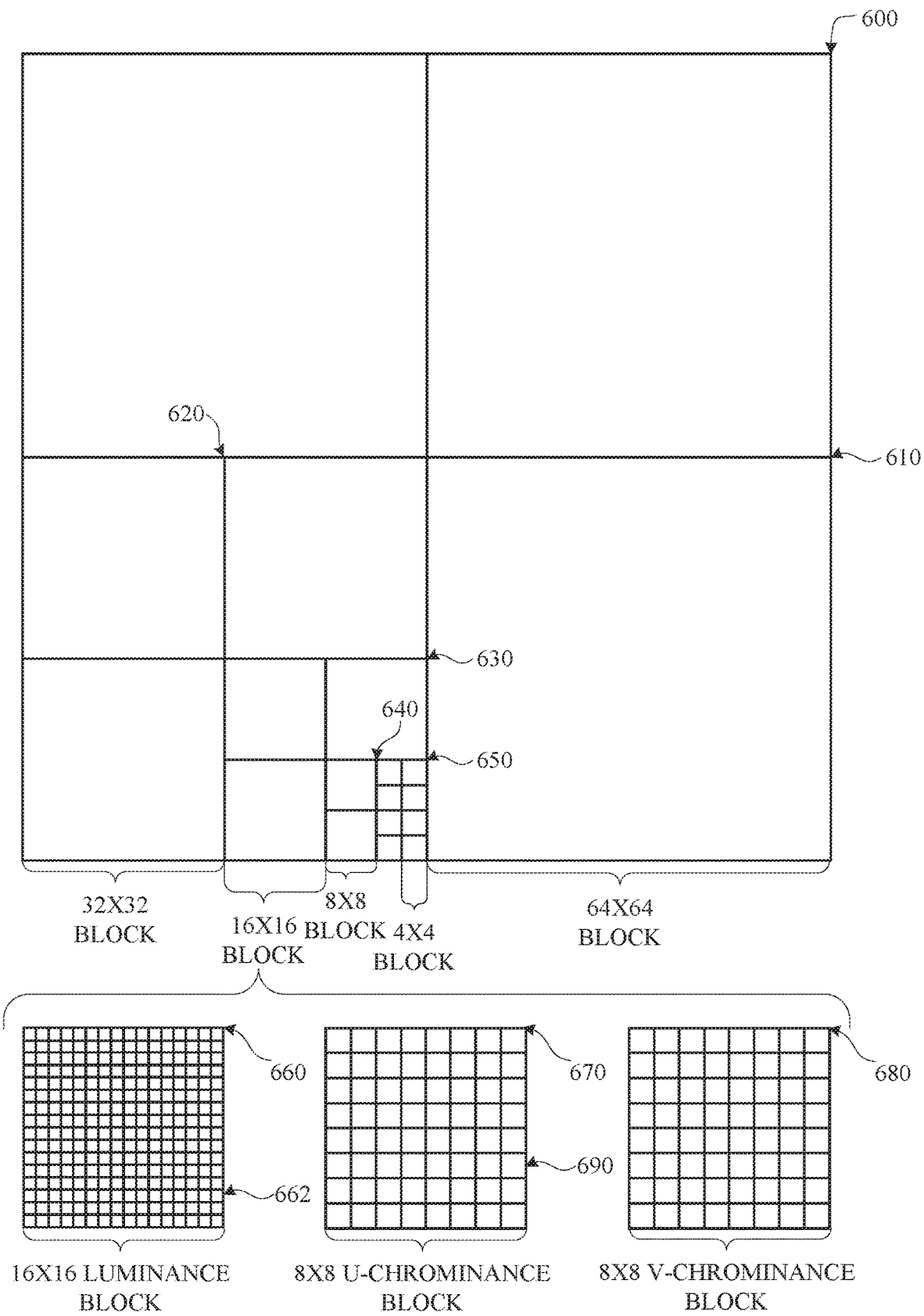
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a predictor to use for encoding a current block or pixel of the current frame with maximal efficiency. For example, the search may identify a portion of the reference frame for which the difference in pixel values between the current block and a prediction block generated based on the portion of the reference frame is minimized, and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a predictor may include calculating a cost function, such as a sum of absolute differences (SAD), between the pixels of portions of the search area and the pixels of the current block.

In some implementations, the spatial difference between the location of the portion of the reference frame for generating a predictor in the reference frame and the current block in the current frame may be represented as a motion vector. The difference in pixel values between the predictor block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties, and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
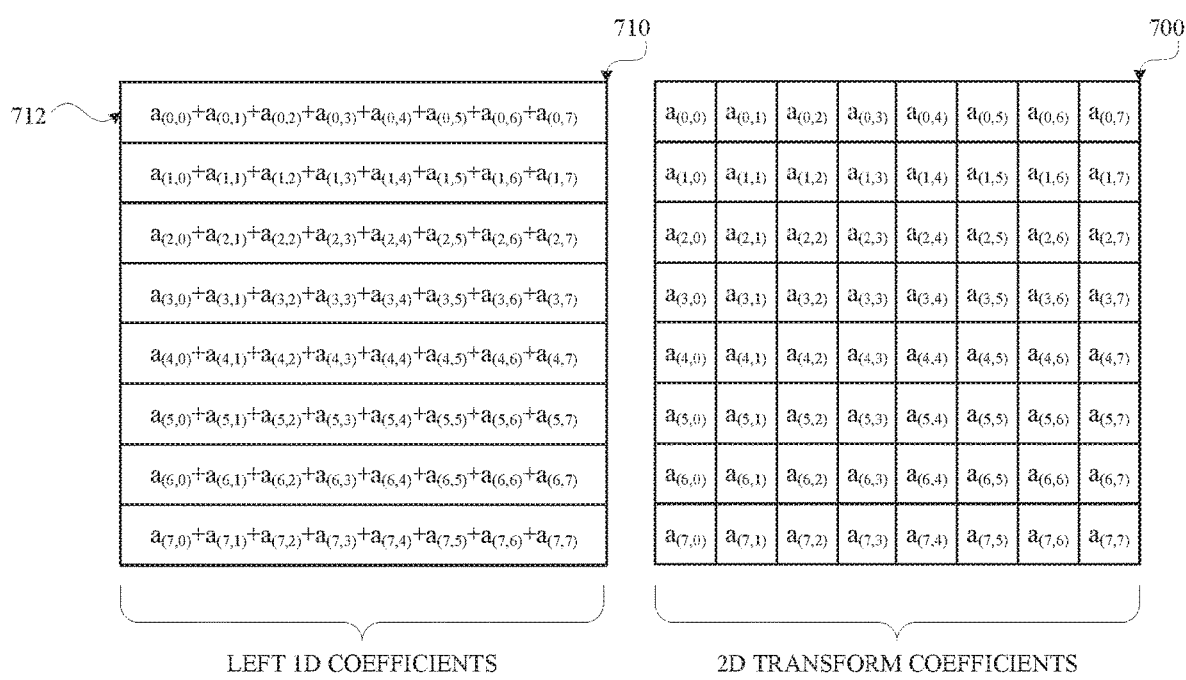
FIG. 7 is a block diagram of a representation of two-dimensional transform coefficients and generating corresponding left one-dimensional transform coefficients for decoding a block of a frame in accordance with implementations of this disclosure.

FIG. 7 is a block diagram of a representation of two-dimensional transform coefficients 700 and generating corresponding left one-dimensional transform coefficients 710 for decoding a block of a frame, such as the frame 330 shown in FIG. 3, in accordance with implementations of this disclosure.

As shown, two-dimensional transform coefficients 700 for a block of a frame are represented as an 8×8 block, including 64 two-dimensional transform coefficients in eight rows and eight columns in a matrix or Cartesian plane. Each respective two-dimensional transform coefficient from the two-dimensional transform coefficients 700 is indicated based on position using Cartesian coordinates as $a_{(i,j)}$. Although an 8×8 block is shown in FIG. 7, any size block, such as an N×M block, may be used.

The left one-dimensional transform coefficients 710 include a left one-dimensional transform coefficient corresponding to each respective row of the two-dimensional transform coefficients 700. A left one-dimensional transform coefficient may be determined as a sum of the respective two-dimensional transform coefficients from the corresponding row from the two-dimensional transform coefficients 700.

Determining left one-dimensional transform coefficients 710 (L) for the two-dimensional transform coefficients 700 may be expressed as the following:

$$L_i = \Sigma_{j=0}^{M-1} a_{(i,j)}, \text{ for } i=0, \ldots, N-1. \quad \text{[Equation 1]}$$

For example, the left one-dimensional transform coefficient 712 ($L_0$) corresponding to the top row (i=0) may be determined as a sum of the respective two-dimensional transform coefficients [$a_{(0,0)}$, $a_{(0,1)}$, $a_{(0,2)}$, $a_{(0,3)}$, $a_{(0,4)}$, $a_{(0,5)}$, $a_{(0,6)}$, $a_{(0,7)}$] from the corresponding row from the two-dimensional transform coefficients 700.

Figure 8:
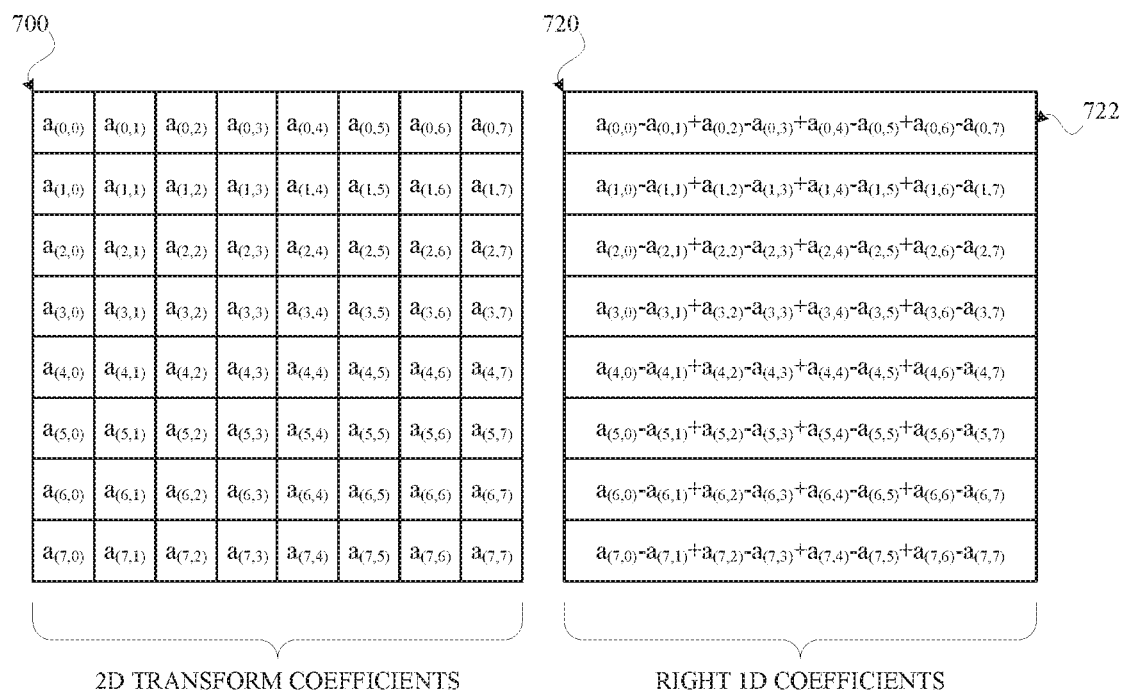
FIG. 8 is a block diagram of a representation of the two-dimensional transform coefficients and generating corresponding right one-dimensional transform coefficients for decoding a block of a frame in accordance with implementations of this disclosure.

FIG. 8 is a block diagram of a representation of the two-dimensional transform coefficients 700, as shown in FIG. 7, and generating corresponding right one-dimensional transform coefficients 720 for decoding a block of a frame, such as the frame 330 shown in FIG. 3, in accordance with implementations of this disclosure.

The right one-dimensional transform coefficients 720 include a right one-dimensional transform coefficient corresponding to each respective row of the two-dimensional transform coefficients 700. A right one-dimensional transform coefficient may be determined as a sum of the respective two-dimensional transform coefficients from the corresponding row from the two-dimensional transform coefficients 700, wherein in the sum is determined using alternating sign summation. Alternating sign summation may include alternating between adding respective values, such as two-dimensional transform coefficients from even columns or even rows, and subtracting respective values, such as two-dimensional transform coefficients from odd columns or odd rows.

Determining right one-dimensional transform coefficients 720 (R) for the two-dimensional transform coefficients 700 may be expressed as the following:

$$R_i = \Sigma_{j=0}^{M-1} a_{(i,j)} (-1)^j, \text{ for } i=0, \ldots, N-1. \quad \text{[Equation 2]}$$

For example, the right one-dimensional transform coefficient 722 ($R_0$) corresponding to the top row (i=0) may be determined as an alternating sign summation of the respective two-dimensional transform coefficients [$a_{(0,0)}$, $a_{(0,1)}$, $a_{(0,2)}$, $a_{(0,3)}$, $a_{(0,4)}$, $a_{(0,5)}$, $a_{(0,6)}$, $a_{(0,7)}$] from the corresponding row from the two-dimensional transform coefficients 700, which may be expressed as $R_0 = a_{(0,0)} - a_{(0,1)} + a_{(0,2)} - a_{(0,3)} + a_{(0,4)} - a_{(0,5)} + a_{(0,6)} - a_{(0,7)}$.

FIG. 9 is a block diagram of a representation of the two-dimensional transform coefficients 700, as shown in FIG. 7, and generating corresponding top one-dimensional transform coefficients 730 for decoding a block of a frame, such as the frame 330 shown in FIG. 3, in accordance with implementations of this disclosure.

The top one-dimensional transform coefficients 730 include a top one-dimensional transform coefficient corresponding to each respective column of the two-dimensional transform coefficients 700. A top one-dimensional transform coefficient may be determined as a sum of the respective two-dimensional transform coefficients from the corresponding column from the two-dimensional transform coefficients 700.

Determining top one-dimensional transform coefficients 730 (T) for the two-dimensional transform coefficients 700 may be expressed as the following:

$$T_j = \Sigma_{i=0}^{N-1} a_{(i,j)}, \text{ for } j=0, \ldots, M-1. \quad \text{[Equation 3]}$$

For example, the top one-dimensional transform coefficient 732 ($T_0$) corresponding to the left column (j=0) may be determined as a sum of the respective two-dimensional transform coefficients [$a_{(0,0)}$, $a_{(1,0)}$, $a_{(2,0)}$, $a_{(3,0)}$, $a_{(4,0)}$, $a_{(5,0)}$, $a_{(6,0)}$, $a_{(7,0)}$] from the corresponding column from the two-dimensional transform coefficients 700.

FIG. 10 is a block diagram of a representation of the two-dimensional transform coefficients 700, as shown in FIG. 7, and generating corresponding bottom one-dimensional transform coefficients 740 for decoding a block of a frame, such as the frame 330 shown in FIG. 3, in accordance with implementations of this disclosure.

The bottom one-dimensional transform coefficients 740 include a bottom one-dimensional transform coefficient corresponding to each respective column of the two-dimensional transform coefficients 700. A bottom one-dimensional transform coefficient may be determined as a sum of the respective two-dimensional transform coefficients from the corresponding column from the two-dimensional transform coefficients 700, wherein in the sum is determined using alternating sign summation.

Determining bottom one-dimensional transform coefficients 740 (B) for the two-dimensional transform coefficients 700 may be expressed as the following:

$$B_j = \Sigma_{i=0}^{N-1} a_{(i,j)}(-1)^i, \text{ for } j=0, \ldots, M-1.\quad\text{[Equation 4]}$$

For example, the bottom one-dimensional transform coefficient 742 ($B_0$) corresponding to the left column (j=0) may be determined as an alternating sign summation of the respective two-dimensional transform coefficients [$a_{(0,0)}$, $a_{(1,0)}$, $a_{(2,0)}$, $a_{(3,0)}$, $a_{(4,0)}$, $a_{(5,0)}$, $a_{(6,0)}$, $a_{(7,0)}$] from the corresponding column from the two-dimensional transform coefficients 700, which may be expressed as $R_0 = a_{(0,0)} - a_{(1,0)} + a_{(2,0)} - a_{(3,0)} + a_{(4,0)} - a_{(5,0)} + a_{(6,0)} - a_{(7,0)}$.

Figure 11:
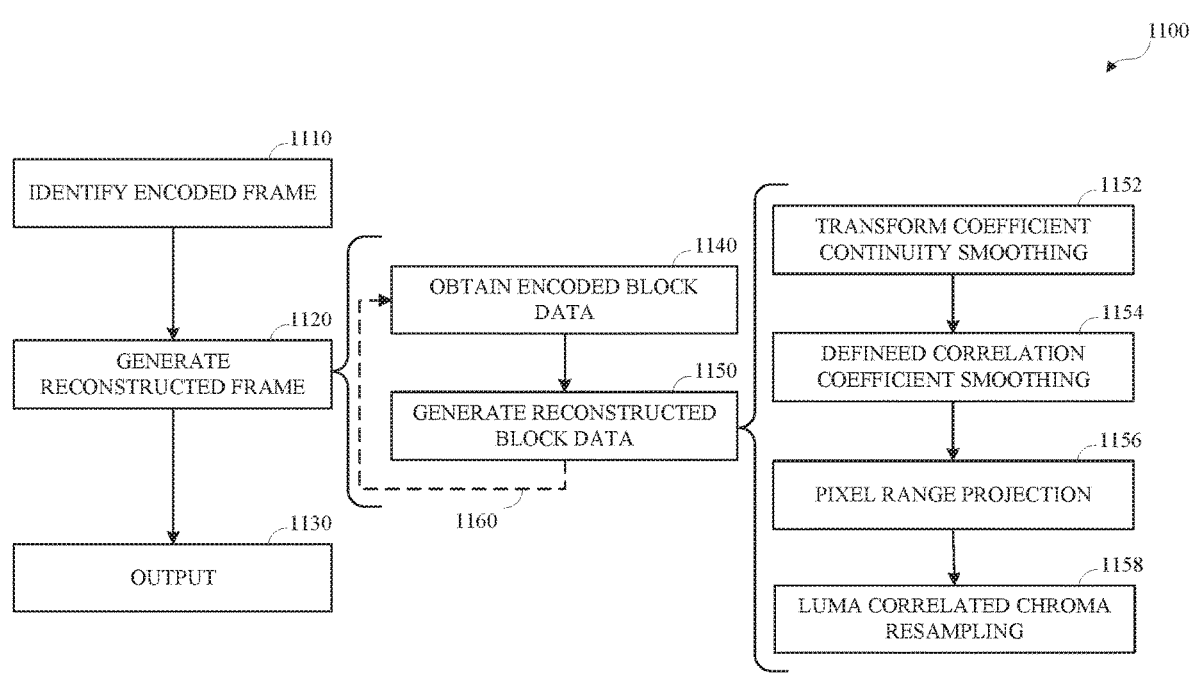
FIG. 11 is a flowchart diagram of an example of decoding using block artefact reduction in accordance with implementations of this disclosure.

FIG. 11 is a flowchart diagram of an example of decoding using block artefact reduction 1100 in accordance with implementations of this disclosure. Decoding using block artefact reduction 1100 may be implemented in a decoder, such as the decoder 500 shown in FIG. 5. For example, the inverse transform unit 530 of the decoder 500 shown in FIG. 5 may implement decoding using block artefact reduction 1100. Decoding using block artefact reduction 1100 may be implemented in a decode path of an encoder, such as the encoder 400 shown in FIG. 4.

As shown in FIG. 11, decoding using block artefact reduction 1100 includes identifying an encoded frame at 1110, generating reconstructed frame data at 1120, and outputting the reconstructed frame data at 1130.

An encoded frame may be identified at 1110. Identifying the encoded frame may include decoding, or partially decoding, encoded frame data from an encoded bitstream. For example, the decoder may receive a compressed bitstream, such as the compressed bitstream 404 shown in FIG. 4, including the encoded data, and may decode, or partially decode, the compressed bitstream to identify the encoded frame data, such as by entropy decoding the frame data and dequantizing the frame data.

Reconstructed frame data may be generated at 1120. Generating the reconstructed frame includes generating a reconstructed frame, which includes obtaining encoded block data at 1140 and generating reconstructed block data at 1150.

Encoded block data may be obtained at 1140. Obtaining the encoded block data may include identifying the encoded block data from the encoded bitstream, such as from the frame data identified at 1110. For example, the encoded block data may include two-dimensional transform coefficients, such as shown at 700 in FIGS. 7-10, for a current block from the reconstructed frame.

Reconstructed block data may be generated at 1150. Generating the reconstructed block data includes transform coefficient continuity smoothing at 1152, defined correlation coefficient smoothing at 1154, pixel range projection at 1156, and luminance correlated chrominance resampling at 1158.

Figure 12:
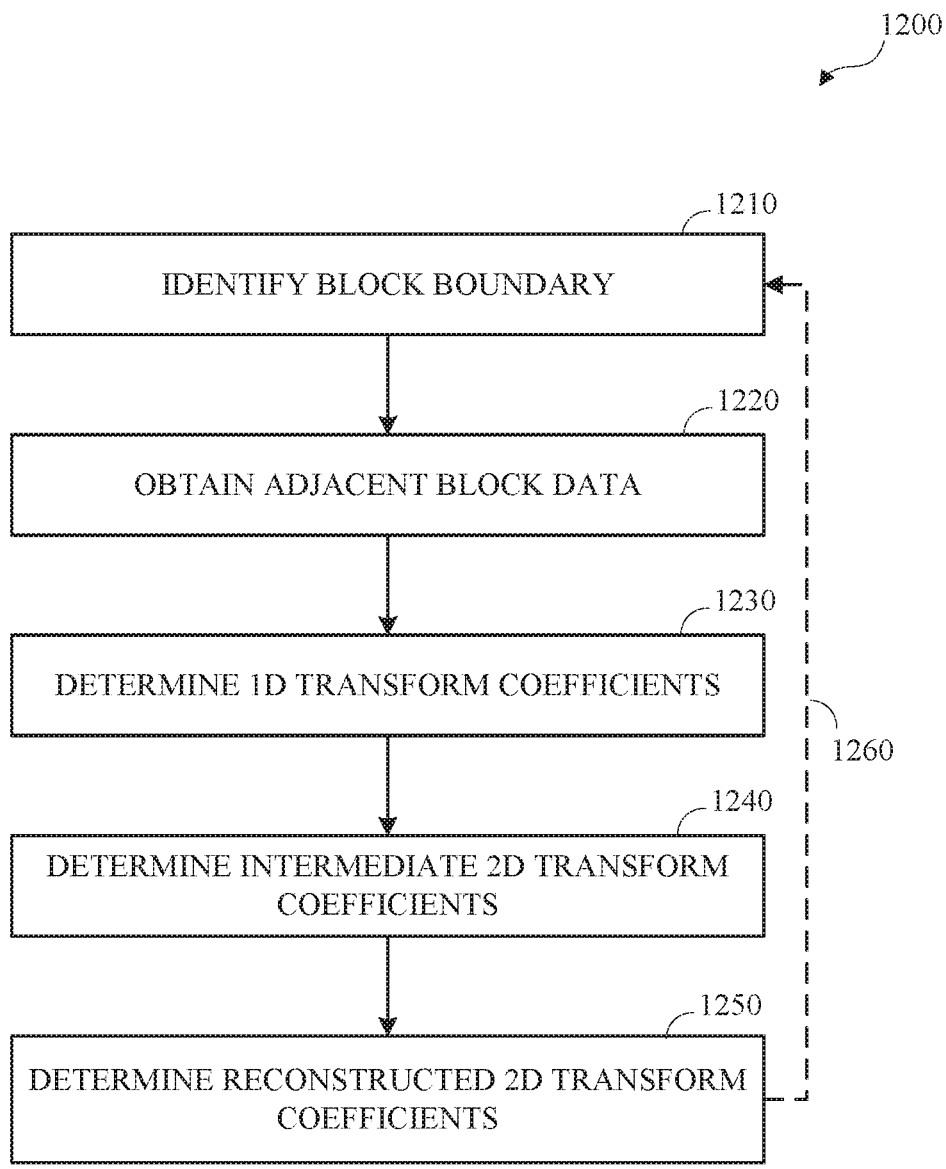
FIG. 12 is a flowchart diagram of an example of transform coefficient continuity smoothing in accordance with implementations of this disclosure.

Transform coefficient continuity smoothing may be performed at 1152. For example, transform coefficient continuity smoothing may be performed based on the current block, the adjacent block, and the block boundary. An example of transform coefficient continuity smoothing is shown in FIG. 12.

Defined correlation coefficient smoothing may be performed at 1154. Applying defined correlation coefficient smoothing may include adjusting one or more two-dimensional transform coefficients, such as decoded two-dimensional transform coefficients or reconstructed two-dimensional transform coefficients based on defined correlations between defined coefficients, such as using a linear, or pseudo-linear, slope, which may remove or reduce artifacts, such as wavy distortion of decoded interpolated pixel data, or using a step function. Integral transform coefficient correlations may be used such that that a development that is described by a cosine indicates a linear development, which may be expressed within the quantization range. At a defined maximum quantization, a linear slope, such as corresponding to an image of the sky, may not collapse into piece-wise cosine wave reconstruction, and may be represented as piece-wise linear patches, such as when the upper 2×2 corner contains non-zero DCT coefficients.

For example, low frequency, such as the lowest frequency [(0,1), (1,0)], coefficients may be adjusted based on a defined correlation (linear slope) with respective corresponding next overtone coefficients [(0,3), (3,0)]. In some implementations, other coefficients, such as the $5^{th}$, 7, and $9^{th}$ coefficients, may be similarly adjusted. The values of transform coefficients adjusted using linear correlation coefficient smoothing may be limited based on the quantization range described in the encoded image. The quantization range can be derived from the quantized value and a quantization matrix.

For object boundaries, where the object occludes background contact, correlations based on a step function may be used. For gradients, or other slowly spatially changing lighting conditions, a linear progression may be used.

For example, the quantization thresholds for a coefficient may indicate a range of values for the respective coefficient, such as from 50 to 149. The value of a transform coefficient adjusted using linear correlation coefficient smoothing may have a value of 160, the corresponding quantization thresholds may indicate a range of values for the respective coefficient from 50 to 149, and transform coefficient adjusted using linear correlation coefficient smoothing value of 160 may be limited to the maximum value of 149 indicated by the corresponding quantization thresholds.

Pixel range projection may be performed at 1156. Pixel range projection may include inverse transforming the transform coefficients to generate pixel values. The pixel values (x), which may be RGB format pixel values, may be limited to a defined range, such as from zero to two-hundred fifty-five (0<=x<=255). The limited, or clamped, pixel values may be transformed, such as using a discrete cosine transform (DCT), to generate limited range transform coefficients. The limited range transform coefficients may be adjusted based on compressed value ranges and within smoothing constraints to generate pixel range projection adjusted transform coefficients, which may be inverse transformed to generate reconstructed pixel values.

Generating reconstructed image data may include luminance correlated chrominance resampling at 1158, which may include resampling some image data, such as chrominance data. For example, the image data may be formatted using YUV 4:2:0 formatting, and the U and V channel data may be resampled based on Y channel data correlations. luminance correlated chrominance resampling obtaining a local correlation coefficient between intensity by looking at a spatially windowed part of the image, such as through a Gaussian window, or by calculating a correlation coefficient within a square of image. For the missing high frequency data in chromacity planes, data from the intensity plane may be projected into chromacity planes multiplied by the local correlation coefficients.

The reconstructed luminance data, Y channel data, may be down-sampled to the resolution of the chrominance data. Correlations among the down-sampled luminance data may be applied to corresponding coefficients of the respective chrominance channels. For example, correlations among neighboring down-sampled luminance coefficients may be identified using a filter, such as a high pass filter, such as a Laplace filter. The chrominance data may be up-sampled to the resolution of the reconstructed luminance data using the respective correlations.

Decoded (reconstructed) data may be output at 1130. For example, decoded frame may be stored in a memory, such as the memory 110 shown in FIG. 1, of a device, such as the computing device 100 shown in FIG. 1 or the computing and communication devices 100A, 100B, 100C shown in FIG. 2, or may be presented to a user.

In some implementations, one or more elements of decoding using block artifact reduction 1100 may be omitted or combined. For example, one or more of transform coefficient continuity smoothing at 1152, defined correlation coefficient smoothing at 1154, pixel range projection at 1156, or luminance correlated chrominance resampling at 1158 may be omitted.

FIG. 12 is a flowchart diagram of an example of transform coefficient continuity smoothing 1200 in accordance with implementations of this disclosure. Transform coefficient continuity smoothing 1200 may be implemented in a decoder, such as the decoder 500 shown in FIG. 5. For example, the inverse transform unit 530 of the decoder 500 shown in FIG. 5 may implement transform coefficient continuity smoothing 1200. Transform coefficient continuity smoothing 1200 may be implemented in a decode path of an encoder, such as the encoder 400 shown in FIG. 4.

As shown in FIG. 12, transform coefficient continuity smoothing 1200 includes identifying a block boundary at 1210, obtaining adjacent block data at 1220, determining one-dimensional transform coefficients at 1230, determining intermediate two-dimensional transform coefficients at 1240, and determining reconstructed two-dimensional transform coefficients at 1250. Identifying a block boundary at 1210, obtaining adjacent block data at 1220, determining one-dimensional transform coefficients at 1230, determining intermediate two-dimensional transform coefficients at 1240, and determining reconstructed two-dimensional transform coefficients at 1250 may be performed for each boundary of the current block as indicated by the broken line at 1260.

A block boundary may be identified at 1210. For example, the block boundary may be identified along the left edge of the current block as shown in FIG. 7, along the right edge of the current block as shown in FIG. 8, along the top edge of the current block as shown in FIG. 9, or along the bottom edge of the current block as shown in FIG. 10.

Adjacent block data may be obtained at 1220. Obtaining the adjacent block data may include determining that the adjacent block data is available. For example, for a block at the top left corner of the frame, adjacent block data to the right of the block and below the block may be available and adjacent block data to the left of the block and above the block may be unavailable. Obtaining the adjacent block data may include decoding, or partially decoding, the adjacent block data from the encoded bitstream, or obtaining previously decoded, or partially decoded, adjacent block data. The adjacent block data may include two-dimensional transform coefficients for the adjacent block.

One-dimensional transform coefficients may be determined at 1230. Determining the one-dimensional transform coefficients may include determining one-dimensional transform coefficients for the current block based on the two-dimensional transform coefficients for the current block and the block boundary. Determining the one-dimensional transform coefficients may include determining one-dimensional transform coefficients for the adjacent block based on the two-dimensional transform coefficients for the adjacent block and the block boundary. Determining the determining one-dimensional transform coefficients may include determining a relative orientation of the block boundary to the current block, the adjacent block, or both.

For example, the current block may be to the right of the adjacent block, determining the one-dimensional transform coefficients for the current block may include generating corresponding left one-dimensional transform coefficients as shown in FIG. 7, and determining the one-dimensional transform coefficients for the adjacent block may include generating corresponding right one-dimensional transform coefficients as shown in FIG. 8, such as in response to a determination that the block boundary corresponds with the left edge of the current block and the right edge of the adjacent block.

In another example, the current block may be to the left of the adjacent block, determining the one-dimensional transform coefficients for the current block may include generating corresponding right one-dimensional transform coefficients as shown in FIG. 8, and determining the one-dimensional transform coefficients for the adjacent block may include generating corresponding left one-dimensional transform coefficients as shown in FIG. 7, such as in response to a determination that the block boundary corresponds with the right edge of the current block and the left edge of the adjacent block.

In another example, the current block may be below the adjacent block, determining the one-dimensional transform coefficients for the current block may include generating corresponding top one-dimensional transform coefficients as shown in FIG. 9, and determining the one-dimensional transform coefficients for the adjacent block may include generating corresponding bottom one-dimensional transform coefficients as shown in FIG. 10, such as in response to a determination that the block boundary corresponds with the top edge of the current block and the bottom edge of the adjacent block.

In another example, the current block may be above the adjacent block, determining the one-dimensional transform coefficients for the current block may include generating corresponding bottom one-dimensional transform coefficients as shown in FIG. 10, and determining the one-dimensional transform coefficients for the adjacent block may include generating corresponding top one-dimensional transform coefficients as shown in FIG. 9, such as in response to a determination that the block boundary corresponds with the bottom edge of the current block and the top edge of the adjacent block.

Intermediate two-dimensional transform coefficients may be determined at 1240. Determining the intermediate two-dimensional transform coefficients may include determining intermediate two-dimensional transform coefficients for the current block based on the block boundary, the one-dimensional transform coefficients for the current block, and the two-dimensional transform coefficients for the current block. Determining the intermediate two-dimensional transform coefficients may include determining intermediate two-dimensional transform coefficients for the adjacent block based on the block boundary, the one-dimensional transform coefficients for the adjacent block, and the two-dimensional transform coefficients for the adjacent block.

For example, the current block may be to the right of the adjacent block, and determining the intermediate two-dimensional transform coefficients ($a'_{(i,j)}$) for the current block, such as in response to a determination that the block boundary corresponds with the left edge of the current block and the right edge of the adjacent block, may include, for each row (i), which may be referred to as the current row, of the current block, determining a difference ($D_i$) between the left one-dimensional transform coefficient (Li) for the current row (i) from the left one-dimensional transform coefficients for the current block and a corresponding right one-dimensional transform coefficient (Ri) for the current row (i) from the right one-dimensional transform coefficients for the adjacent block, which may be expressed as $D_i=L_i-R_i$; and for each coefficient from the current row (i), adding a fraction of the difference (Di) to the corresponding two-dimensional transform coefficient ($a_{(i,j)}$) from the two-dimensional transform coefficients for the current block.

The fraction may be based on the size of the current block. For example, the current block may be an N×M block and the fraction for determining intermediate two-dimensional transform coefficients for the current block wherein the current block is to the right of the adjacent block may be 1/(2M). For an 8×8 block the fraction may be 1/16.

Determining intermediate two-dimensional transform coefficients for the current block wherein the current block is to the right of the adjacent block may be expressed as follows:

$$a'_{(i,j)} = \frac{R_i - L_i}{2M} + a_{(i,j)},$$ [Equation 5]

for $i = 0, \ldots, N - 1; j = 0, \ldots, M - 1.$

For example, an adjusted left one-dimensional transform coefficient ($L_i'$) and an adjusted right one-dimensional transform coefficient ($R_i'$) may be expressed as $L_i'=R_i'=(L_i+R_i)/2$ and an adjusted top one-dimensional transform coefficient ($T_j'$) and an adjusted bottom one-dimensional transform coefficient ($B_j'$) may be expressed as $T_j'=B_j'=(T_j+B_j)/2$.

Determining the intermediate two-dimensional transform coefficients ($a'_{(i,j)}$) for the adjacent block, such as in response to a determination that the block boundary corresponds with the left edge of the current block and the right edge of the adjacent block, may include, for each row (i), which may be referred to as the current row, of the adjacent block, and for each coefficient from the current row (i), using alternating sign adjustment to adjust the corresponding two-dimensional transform coefficient ($a_{(i,j)}$) from the two-dimensional transform coefficients for the adjacent block based on the fraction of the difference (Di). Alternating sign adjustment may include alternating between adding the fraction of the difference to respective values, such as two-dimensional transform coefficients from even columns or even rows, and subtracting the fraction of the difference from respective values, such as two-dimensional transform coefficients from odd columns or odd rows.

The fraction may be based on the size of the current block. For example, the current block may be an N×M block and the fraction for determining intermediate two-dimensional transform coefficients for the adjacent block wherein the current block is to the right of the adjacent block may be 1/(2M). For an 8×8 block the fraction may be 1/16.

Determining intermediate two-dimensional transform coefficients for the adjacent block wherein the current block is to the right of the adjacent block may be expressed as follows:

$$a'_{(i,j)} = \left(\frac{L_i - R_i}{2M}\right)(-1)^j + a_{(i,j)},$$ [Equation 6]

for $i = 0, \ldots, N - 1; j = 0, \ldots, M - 1.$

In another example, the current block may be to the left of the adjacent block, and determining the intermediate two-dimensional transform coefficients ($a'_{(i,j)}$) for the current block, such as in response to a determination that the block boundary corresponds with the right edge of the current block and the left edge of the adjacent block, may include, for each row (i) of the current block, determining a difference ($D_i$) between the right one-dimensional transform coefficient (Ri) for the current row (i) from the right one-dimensional transform coefficients for the current block and a corresponding left one-dimensional transform coefficient (Li) for the current row (i) from the left one-dimensional transform coefficients for the adjacent block, which may be expressed as $D_i=R_i-L_i$; and for each coefficient from the current row (i), using alternating sign adjustment to adjust the corresponding two-dimensional transform coefficient ($a_{(i,j)}$) from the two-dimensional transform coefficients for the current block based on the fraction of the difference (Di).

The fraction may be based on the size of the current block. For example, the current block may be an N×M block and the fraction for determining intermediate two-dimensional transform coefficients for the current block wherein the current block is to the left of the adjacent block may be 1/(2M). For an 8×8 block the fraction may be 1/16.

Determining intermediate two-dimensional transform coefficients for the current block wherein the current block is to the left of the adjacent block may be expressed as follows:

$$a'_{(i,j)} = \left(\frac{L_i - R_i}{2M}\right)(-1)^j + a_{(i,j)},$$ [Equation 7]

for $i = 0, \ldots, N - 1; j = 0, \ldots, M - 1.$

Determining the intermediate two-dimensional transform coefficients ($a'_{(i,j)}$) for the adjacent block, such as in response to a determination that the block boundary corresponds with the right edge of the current block and the left edge of the adjacent block, may include, for each row (i), which may be referred to as the current row, of the adjacent block, and for each coefficient from the current row (i), adding the fraction of the difference (Di) to the corresponding two-dimensional transform coefficient ($a_{(i,j)}$) from the two-dimensional transform coefficients for the adjacent block.

The fraction may be based on the size of the current block. For example, the current block may be an N×M block and the fraction for determining intermediate two-dimensional transform coefficients for the current block wherein the current block is to the left of the adjacent block may be 1/(2M). For an 8×8 block the fraction may be 1/16.

Determining intermediate two-dimensional transform coefficients for the adjacent block wherein the current block is to the left of the adjacent block may be expressed as follows:

$$a'_{(i,j)} = \frac{R_i - L_i}{2M} + a_{(i,j)},$$ [Equation 8]

for $i = 0, \ldots, N - 1; j = 0, \ldots, M - 1.$

In another example, the current block may be the below the adjacent block, and determining the intermediate two-dimensional transform coefficients (a'$_{(i,j)}$) for the current block, such as in response to a determination that the block boundary corresponds with the top edge of the current block and the bottom edge of the adjacent block, may include, for each column (j), which may be referred to as the current column, of the current block, determining a difference (D$_j$) between the top one-dimensional transform coefficient (T$_j$) for the current column (j) from the top one-dimensional transform coefficients for the current block and a corresponding bottom one-dimensional transform coefficient (B$_j$) for the current column (j) from the bottom one-dimensional transform coefficients for the adjacent block, which may be expressed as D$_j$=T$_j$−B$_j$; and for each coefficient from the current column (j), adding a fraction of the difference (D$_j$) to the corresponding two-dimensional transform coefficient (a$_{(i,j)}$) from the two-dimensional transform coefficients for the current block.

The fraction may be based on the size of the current block. For example, the current block may be an N×M block and the fraction for determining intermediate two-dimensional transform coefficients for the current block wherein the current block is below the adjacent block may be 1/(2N). For an 8×8 block the fraction may be ⅛16.

Determining intermediate two-dimensional transform coefficients for the current block wherein the current block is below the adjacent block may be expressed as follows:

$$a'_{(i,j)} = \frac{T_j - B_j}{2N} + a_{(i,j)}, \quad \text{[Equation 9]}$$
$$\text{for } i = 0, \ldots, N-1; j = 0, \ldots, M-1.$$

Determining the intermediate two-dimensional transform coefficients (a'$_{(i,j)}$) for the adjacent block, such as in response to a determination that the block boundary corresponds with the top edge of the current block and the bottom edge of the adjacent block, may include, for each column (j), which may be referred to as the current column, of the adjacent block, and for each coefficient from the current column (j), using alternating sign adjustment to adjust the corresponding two-dimensional transform coefficient (a$_{(i,j)}$) from the two-dimensional transform coefficients for the adjacent block based on the fraction of the difference (Dj). Alternating sign adjustment may include alternating between adding the fraction of the difference to respective values, such as two-dimensional transform coefficients from even columns or even rows, and subtracting the fraction of the difference from respective values, such as two-dimensional transform coefficients from odd columns or odd rows.

Determining intermediate two-dimensional transform coefficients for the adjacent block wherein the current block is below the adjacent block may be expressed as follows:

$$a'_{(i,j)} = \left(\frac{T_j - B_j}{2N}\right)(-1)^i + a_{(i,j)}, \quad \text{[Equation 10]}$$
$$\text{for } i = 0, \ldots, N-1; j = 0, \ldots, M-1.$$

In another example, the current block may be above the adjacent block, and determining the intermediate two-dimensional transform coefficients (a'$_{(i,j)}$) for the current block, such as in response to a determination that the block boundary corresponds with the bottom edge of the current block and the top edge of the adjacent block, may include, for each column (j) of the current block, determining a difference (D$_j$) between the bottom one-dimensional transform coefficient (B$_j$) for the current column (j) from the bottom one-dimensional transform coefficients for the current block and a corresponding top one-dimensional transform coefficient (T$_j$) for the current column (j) from the top one-dimensional transform coefficients for the adjacent block, which may be expressed as D$_j$=B$_j$−T$_j$; and for each coefficient from the current column (j), using alternating sign adjustment to adjust the corresponding two-dimensional transform coefficient (a$_{(i,j)}$) from the two-dimensional transform coefficients for the current block based on the fraction of the difference (D$_j$).

Determining intermediate two-dimensional transform coefficients for the current block wherein the current block is above the adjacent block may be expressed as follows:

$$a'_{(i,j)} = \left(\frac{B_j - T_j}{2N}\right)(-1)^i + a_{(i,j)}, \quad \text{[Equation 11]}$$
$$\text{for } i = 0, \ldots, N-1; j = 0, \ldots, M-1.$$

Determining the intermediate two-dimensional transform coefficients (a'$_{(i,j)}$) for the adjacent block, such as in response to a determination that the block boundary corresponds with the bottom edge of the current block and the top edge of the adjacent block, may include, for each column (j), which may be referred to as the current column, of the adjacent block, and for each coefficient from the current column (j), adding the fraction of the difference (D$_j$) to the corresponding two-dimensional transform coefficient (a$_{(i,j)}$) from the two-dimensional transform coefficients for the adjacent block.

Determining intermediate two-dimensional transform coefficients for the adjacent block wherein the current block is above the adjacent block may be expressed as follows:

$$a'_{(i,j)} = \frac{B_j - T_j}{2N} + a_{(i,j)}, \quad \text{[Equation 12]}$$
$$\text{for } i = 0, \ldots, N-1; j = 0, \ldots, M-1.$$

Reconstructed two-dimensional transform coefficients may be determined at 1250. Determining reconstructed two-dimensional transform coefficients, or partially reconstructed two-dimensional transform coefficients, at 1250 may include identifying quantization thresholds corresponding to the respective transform coefficients. For example, the quantization thresholds for a coefficient may indicate a range of values for the respective coefficient, such as from 50 to 149. Determining the reconstructed two-dimensional transform coefficients may include limiting corresponding intermediate two-dimensional transform coefficients based on the quantization thresholds corresponding to the respective transform coefficients.

For example, the intermediate two-dimensional transform coefficient corresponding to a reconstructed two-dimensional transform coefficient may have a value of 160, the corresponding quantization thresholds may indicate a range of values for the respective coefficient from 50 to 149, and the intermediate two-dimensional transform coefficient value of 160 may be limited to the maximum value of 149 indicated by the corresponding quantization thresholds may be identified as the reconstructed two-dimensional transform coefficient. The reconstructed two-dimensional transform coefficients may be output. For example, the reconstructed two-dimensional transform coefficients may be inverse transformed to form spatial, or pixel, data, such as for a reconstructed block, and the spatial data may be included in the reconstructed frame, which may be stored or output for presentation to a user.

In some implementations, identifying the block boundary at 1210, obtaining the adjacent block data at 1220, determining the one-dimensional transform coefficients at 1230, determining the intermediate two-dimensional transform coefficients at 1240, and determining the reconstructed two-dimensional transform coefficients at 1250 may be performed for each boarder of the block as indicated by the broken line at 1260.

In some implementations, the reconstructed coefficients generated based on a first edge of the current block may be generated based on the decoded transform coefficients, the reconstructed coefficients generated based on a second edge of the current block may be generated based on the reconstructed coefficients generated based on the first edge of the current block, the reconstructed coefficients generated based on a third edge of the current block may be generated based on the reconstructed coefficients generated based on the second edge of the current block, and the reconstructed coefficients generated based on a fourth edge of the current block may be generated based on the reconstructed coefficients generated based on the third edge of the current block.

In some implementations, the reconstructed coefficients generated based on each edge of the current block may be generated based on the decoded transform coefficients, the reconstructed coefficients may be combined, and transform coefficient continuity smoothing 1200 may be repeated two or more repetitions.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
generating, by a processor executing instructions stored on a non-transitory computer-readable medium, a reconstructed frame by decoding an encoded bitstream, wherein decoding includes:
obtaining encoded block data from the encoded bitstream, the encoded block data corresponding to a current block from the reconstructed frame;
generating reconstructed block data for the current block based on the encoded block data using transform coefficient continuity smoothing, wherein transform coefficient continuity smoothing includes:
for a block boundary of the current block:
in response to a determination that adjacent block data corresponding to an adjacent block spatially adjacent to the current block along the block boundary is available, performing transform coefficient continuity smoothing based on the current block, the adjacent block, and the block boundary; and
including the reconstructed block data in the reconstructed frame; and
outputting the reconstructed frame.

2. The method of claim 1, wherein:
obtaining the encoded block data from the encoded bitstream includes obtaining two-dimensional transform coefficients for the current block from the encoded bitstream; and
performing transform coefficient continuity smoothing based on the current block and the adjacent block includes:
determining one-dimensional transform coefficients for the current block based on the block boundary and the two-dimensional transform coefficients for the current block; and
determining intermediate two-dimensional transform coefficients for the current block based on the two-dimensional transform coefficients for the current block and a difference between the one-dimensional transform coefficients for the current block and one-dimensional transform coefficients for the adjacent block.

3. The method of claim 2, wherein determining the one-dimensional transform coefficients for the current block includes:
in response to a determination that the block boundary corresponds with a left edge of the current block, for a current row from the two-dimensional transform coefficients for the current block determining a sum of two-dimensional transform coefficients from the current row from the two-dimensional transform coefficients for the current block as a left one-dimensional transform coefficient for a corresponding row from the left one-dimensional transform coefficients for the current block;
in response to a determination that the block boundary corresponds with a right edge of the current block, for the current row from the two-dimensional transform coefficients for the current block determining the sum of the two-dimensional transform coefficients from the current row from the two-dimensional transform coefficients for the current block as a right one-dimensional transform coefficient for a corresponding row from the right one-dimensional transform coefficients for the current block using alternating sign summation;
in response to a determination that the block boundary corresponds with a top edge of the current block, for a current column from the two-dimensional transform coefficients for the current block determining a sum of two-dimensional transform coefficients from the current column from the two-dimensional transform coefficients for the current block as a top one-dimensional transform coefficient for a corresponding column from the top one-dimensional transform coefficients for the current block; and
in response to a determination that the block boundary corresponds with a bottom edge of the current block, for the current column from the two-dimensional transform coefficients for the current block determining the sum of the two-dimensional transform coefficients from the current column from the two-dimensional transform coefficients for the current block as a bottom one-dimensional transform coefficient for a corresponding column from the bottom one-dimensional transform coefficients for the current block using alternating sign summation.

4. The method of claim 3, wherein performing transform coefficient continuity smoothing based on the current block and the adjacent block includes:
obtaining two-dimensional transform coefficients for the adjacent block; and
determining the one-dimensional transform coefficients for the adjacent block based on the block boundary and the two-dimensional transform coefficients for the adjacent block, wherein determining the one-dimensional transform coefficients for the adjacent block includes:
in response to the determination that the block boundary corresponds with the left edge of the current block, for a current row from the two-dimensional transform coefficients for the adjacent block determining a sum of two-dimensional transform coefficients from the current row from the two-dimensional transform coefficients for the adjacent block as a right one-dimensional transform coefficient for a corresponding row from the right one-dimensional transform coefficients for the adjacent block using alternating sign summation;
in response to the determination that the block boundary corresponds with the right edge of the current block, for the current row from the two-dimensional transform coefficients for the adjacent block determining the sum of the two-dimensional transform coefficients from the current row from the two-dimensional transform coefficients for the adjacent block as a left one-dimensional transform coefficient for a corresponding row from the left one-dimensional transform coefficients for the adjacent block;
in response to the determination that the block boundary corresponds with the top edge of the current block, for a current column from the two-dimensional transform coefficients for the adjacent block determining a sum of the two-dimensional transform coefficients from the current column from the two-dimensional transform coefficients for the adjacent block as a bottom one-dimensional transform coefficient for a corresponding column from the bottom one-dimensional transform coefficients for the adjacent block using alternating sign summation; and in response to the determination that the block boundary corresponds with the bottom edge of the current block, for the current column from the two-dimensional transform coefficients for the adjacent block determining the sum of the two-dimensional transform coefficients from the current column from the two-dimensional transform coefficients for the adjacent block as a top one-dimensional transform coefficient for a corresponding column from the top one-dimensional transform coefficients for the adjacent block.

5. The method of claim 4, wherein determining the intermediate two-dimensional transform coefficients for the current block includes:

for a current intermediate two-dimensional transform coefficient from the intermediate two-dimensional transform coefficients for the current block, the current intermediate two-dimensional transform coefficient from the intermediate two-dimensional transform coefficients for the current block spatially corresponding to the current row from the two-dimensional transform coefficients for the current block and a current column from the two-dimensional transform coefficients for the current block:

in response to the determination that the block boundary corresponds with the left edge of the current block, determining the current intermediate two-dimensional transform coefficient from the intermediate two-dimensional transform coefficients for the current block by multiplying a corresponding two-dimensional transform coefficient from the two-dimensional transform coefficients for the current block by a fraction of a difference between a left one-dimensional transform coefficient from a corresponding row from the left one-dimensional transform coefficients for the current block and a right one-dimensional transform coefficient from a corresponding row from the right one-dimensional transform coefficients for the adjacent block;

in response to the determination that the block boundary corresponds with the right edge of the current block, determining the current intermediate two-dimensional transform coefficient from the intermediate two-dimensional transform coefficients for the current block by multiplying the corresponding two-dimensional transform coefficient from the two-dimensional transform coefficients for the current block by the fraction of a difference between a right one-dimensional transform coefficient from a corresponding row from the right one-dimensional transform coefficients for the current block and a left one-dimensional transform coefficient from a corresponding row from the left one-dimensional transform coefficients for the adjacent block using alternating sign multiplication;

in response to the determination that the block boundary corresponds with the top edge of the current block, determining the current intermediate two-dimensional transform coefficient from the intermediate two-dimensional transform coefficients for the current block by multiplying the corresponding two-dimensional transform coefficient from the two-dimensional transform coefficients for the current block by the fraction of a difference between a top one-dimensional transform coefficient from a corresponding column from the top one-dimensional transform coefficients for the current block and a bottom one-dimensional transform coefficient from a corresponding column from the bottom one-dimensional transform coefficients for the adjacent block; and in response to the determination that the block boundary corresponds with the bottom edge of the current block, determining the current intermediate two-dimensional transform coefficient from the intermediate two-dimensional transform coefficients for the current block by multiplying the corresponding two-dimensional transform coefficient from the two-dimensional transform coefficients for the current block by the fraction of a difference between a bottom one-dimensional transform coefficient from a corresponding column from the bottom one-dimensional transform coefficients for the current block and a top one-dimensional transform coefficient from a corresponding column from the top one-dimensional transform coefficients for the adjacent block using alternating sign multiplication.

6. The method of claim 4, wherein generating reconstructed block data for the current block includes generating partially reconstructed block data for the adjacent block by:

determining intermediate two-dimensional transform coefficients for the adjacent block based on the two-dimensional transform coefficients for the adjacent block and the difference between the one-dimensional transform coefficients for the current block and the one-dimensional transform coefficients for the adjacent block.

7. The method of claim 6, wherein determining the intermediate two-dimensional transform coefficients for the adjacent block includes:

for a current intermediate two-dimensional transform coefficient from the intermediate two-dimensional transform coefficients for the adjacent block, the current intermediate two-dimensional transform coefficient from the intermediate two-dimensional transform coefficients for the adjacent block spatially corresponding to the current row from the two-dimensional transform coefficients for the adjacent block and a current column from the two-dimensional transform coefficients for the adjacent block:

in response to the determination that the block boundary corresponds with the left edge of the current block, determining the current intermediate two-dimensional transform coefficient from the intermediate two-dimensional transform coefficients for the adjacent block by multiplying a corresponding two-dimensional transform coefficient from the two-dimensional transform coefficients for the adjacent block by the fraction of a difference between a right one-dimensional transform coefficient from a corresponding row from the right one-dimensional transform coefficients for the adjacent block and a left one-dimensional transform coefficient from a corresponding row from the left one-dimensional transform coefficients for the current block using alternating sign multiplication;

in response to the determination that the block boundary corresponds with the right edge of the current block, determining the current intermediate two-dimensional transform coefficient from the intermediate two-dimensional transform coefficients for the adjacent block by multiplying the corresponding two-dimensional transform coefficient from the two-dimensional transform coefficients for the adjacent block by the fraction of a difference between a left one-dimensional transform coefficient from a corresponding row from the left one-dimensional transform coefficients for the adjacent block and a right one-dimensional transform coefficient from a corresponding row from the right one-dimensional transform coefficients for the current block;

in response to the determination that the block boundary corresponds with the top edge of the current block, determining the current intermediate two-dimensional transform coefficient from the intermediate two-dimensional transform coefficients for the adjacent block by multiplying a corresponding two-dimensional transform coefficient from the two-dimensional transform coefficients for the adjacent block by the fraction of a difference between a bottom one-dimensional transform coefficient from a corresponding column from the bottom one-dimensional transform coefficients for the adjacent block and a top one-dimensional transform coefficient from a corresponding column from the top one-dimensional transform coefficients for the current block using alternating sign multiplication; and in response to the determination that the block boundary corresponds with the bottom edge of the current block, determining the current intermediate two-dimensional transform coefficient from the intermediate two-dimensional transform coefficients for the adjacent block by multiplying the corresponding two-dimensional transform coefficient from the two-dimensional transform coefficients for the adjacent block by the fraction of a difference between a top one-dimensional transform coefficient from a corresponding column from the top one-dimensional transform coefficients for the adjacent block and a bottom one-dimensional transform coefficient from a corresponding column from the bottom one-dimensional transform coefficients for the current block.

8. The method of claim 6, wherein generating the partially reconstructed block data for the adjacent block includes:
generating partially reconstructed two-dimensional transform coefficients for the adjacent block based on the intermediate two-dimensional transform coefficients for the adjacent block and corresponding quantization thresholds; and
including the partially reconstructed two-dimensional transform coefficients for the adjacent block in the partially reconstructed block data for the adjacent block.

9. The method of claim 2, wherein transform coefficient continuity smoothing based on the two-dimensional transform coefficients for the current block from the encoded bitstream includes:
generating partially reconstructed two-dimensional transform coefficients for the current block based on the intermediate two-dimensional transform coefficients for the current block and corresponding quantization thresholds; and
including the partially reconstructed two-dimensional transform coefficients in the reconstructed block data for the current block.

10. A decoder comprising:
a non-transitory computer-readable memory including instructions for generating a reconstructed frame by decoding an encoded bitstream; and a processor, operatively coupled to the non-transitory computer-readable memory, for receiving the instructions from the non-transitory computer-readable memory and executing the instructions to:
obtain encoded block data from the encoded bitstream, the encoded block data corresponding to a current block from the reconstructed frame;
generate reconstructed block data for the current block based on the encoded block data using transform coefficient continuity smoothing, wherein transform coefficient continuity smoothing includes:
for a block boundary of the current block:
in response to a determination that adjacent block data corresponding to an adjacent block spatially adjacent to the current block along the block boundary is available, performing transform coefficient continuity smoothing based on the current block, the adjacent block, and the block boundary; and
include the reconstructed block data in the reconstructed frame; and
output the reconstructed frame.

11. The decoder of claim 10, wherein the processor is configured to:
obtain the encoded block data from the encoded bitstream by obtaining two-dimensional transform coefficients for the current block from the encoded bitstream; and
perform transform coefficient continuity smoothing based on the current block and the adjacent block by:
determining one-dimensional transform coefficients for the current block based on the block boundary and the two-dimensional transform coefficients for the current block; and
determining intermediate two-dimensional transform coefficients for the current block based on the two-dimensional transform coefficients for the current block and a difference between the one-dimensional transform coefficients for the current block and one-dimensional transform coefficients for the adjacent block.

12. The decoder of claim 11, wherein the processor is configured to determine the one-dimensional transform coefficients for the current block by:
in response to a determination that the block boundary corresponds with a left edge of the current block, for a current row from the two-dimensional transform coefficients for the current block determining a sum of two-dimensional transform coefficients from the current row from the two-dimensional transform coefficients for the current block as a left one-dimensional transform coefficient for a corresponding row from the left one-dimensional transform coefficients for the current block;
in response to a determination that the block boundary corresponds with a right edge of the current block, for the current row from the two-dimensional transform coefficients for the current block determining the sum of the two-dimensional transform coefficients from the current row from the two-dimensional transform coefficients for the current block as a right one-dimensional transform coefficient for a corresponding row from the right one-dimensional transform coefficients for the current block using alternating sign summation;
in response to a determination that the block boundary corresponds with a top edge of the current block, for a current column from the two-dimensional transform coefficients for the current block determining a sum of two-dimensional transform coefficients from the current column from the two-dimensional transform coefficients for the current block as a top one-dimensional transform coefficient for a corresponding column from the top one-dimensional transform coefficients for the current block; and in response to a determination that the block boundary corresponds with a bottom edge of the current block, for the current column from the two-dimensional transform coefficients for the current block determining the sum of the two-dimensional transform coefficients from the current column from the two-dimensional transform coefficients for the current block as a bottom one-dimensional transform coefficient for a corresponding column from the bottom one-dimensional transform coefficients for the current block using alternating sign summation.

13. The decoder of claim 12, wherein the processor is configured to perform transform coefficient continuity smoothing based on the current block and the adjacent block by:

obtaining two-dimensional transform coefficients for the adjacent block; and determining the one-dimensional transform coefficients for the adjacent block based on the block boundary and the two-dimensional transform coefficients for the adjacent block, wherein determining the one-dimensional transform coefficients for the adjacent block includes:

in response to the determination that the block boundary corresponds with the left edge of the current block, for a current row from the two-dimensional transform coefficients for the adjacent block determining a sum of two-dimensional transform coefficients from the current row from the two-dimensional transform coefficients for the adjacent block as a right one-dimensional transform coefficient for a corresponding row from the right one-dimensional transform coefficients for the adjacent block using alternating sign summation;

in response to the determination that the block boundary corresponds with the right edge of the current block, for the current row from the two-dimensional transform coefficients for the adjacent block determining the sum of the two-dimensional transform coefficients from the current row from the two-dimensional transform coefficients for the adjacent block as a left one-dimensional transform coefficient for a corresponding row from the left one-dimensional transform coefficients for the adjacent block;

in response to the determination that the block boundary corresponds with the top edge of the current block, for a current column from the two-dimensional transform coefficients for the adjacent block determining a sum of the two-dimensional transform coefficients from the current column from the two-dimensional transform coefficients for the adjacent block as a bottom one-dimensional transform coefficient for a corresponding column from the bottom one-dimensional transform coefficients for the adjacent block using alternating sign summation; and in response to the determination that the block boundary corresponds with the bottom edge of the current block, for the current column from the two-dimensional transform coefficients for the adjacent block determining the sum of the two-dimensional transform coefficients from the current column from the two-dimensional transform coefficients for the adjacent block as a top one-dimensional transform coefficient for a corresponding column from the top one-dimensional transform coefficients for the adjacent block.

14. The decoder of claim 13, wherein the processor is configured to determine the intermediate two-dimensional transform coefficients for the current block by:

for a current intermediate two-dimensional transform coefficient from the intermediate two-dimensional transform coefficients for the current block, the current intermediate two-dimensional transform coefficient from the intermediate two-dimensional transform coefficients for the current block spatially corresponding to the current row from the two-dimensional transform coefficients for the current block and a current column from the two-dimensional transform coefficients for the current block:

in response to the determination that the block boundary corresponds with the left edge of the current block, determining the current intermediate two-dimensional transform coefficient from the intermediate two-dimensional transform coefficients for the current block by multiplying a corresponding two-dimensional transform coefficient from the two-dimensional transform coefficients for the current block by a fraction of a difference between a left one-dimensional transform coefficient from a corresponding row from the left one-dimensional transform coefficients for the current block and a right one-dimensional transform coefficient from a corresponding row from the right one-dimensional transform coefficients for the adjacent block;

in response to the determination that the block boundary corresponds with the right edge of the current block, determining the current intermediate two-dimensional transform coefficient from the intermediate two-dimensional transform coefficients for the current block by multiplying the corresponding two-dimensional transform coefficient from the two-dimensional transform coefficients for the current block by the fraction of a difference between a right one-dimensional transform coefficient from a corresponding row from the right one-dimensional transform coefficients for the current block and a left one-dimensional transform coefficient from a corresponding row from the left one-dimensional transform coefficients for the adjacent block using alternating sign multiplication;

in response to the determination that the block boundary corresponds with the top edge of the current block, determining the current intermediate two-dimensional transform coefficient from the intermediate two-dimensional transform coefficients for the current block by multiplying the corresponding two-dimensional transform coefficient from the two-dimensional transform coefficients for the current block by the fraction of a difference between a top one-dimensional transform coefficient from a corresponding column from the top one-dimensional transform coefficients for the current block and a bottom one-dimensional transform coefficient from a corresponding column from the bottom one-dimensional transform coefficients for the adjacent block; and in response to the determination that the block boundary corresponds with the bottom edge of the current block, determining the current intermediate two-dimensional transform coefficient from the intermediate two-dimensional transform coefficients for the current block by multiplying the corresponding two-dimensional transform coefficient from the two-dimensional transform coefficients for the current block by the fraction of a difference between a bottom one-dimensional transform coefficient from a corresponding column from the bottom one-dimensional transform coefficients for the current block and a top one-dimensional transform coefficient from a corresponding column from the top one-dimensional transform coefficients for the adjacent block using alternating sign multiplication.

15. The decoder of claim 13, wherein the processor is configured to generate reconstructed block data for the current block includes generating partially reconstructed block data for the adjacent block by:
   determining intermediate two-dimensional transform coefficients for the adjacent block based on the two-dimensional transform coefficients for the adjacent block and the difference between the one-dimensional transform coefficients for the current block and the one-dimensional transform coefficients for the adjacent block.

16. The decoder of claim 15, wherein the processor is configured to determine the intermediate two-dimensional transform coefficients for the adjacent block by:
   for a current intermediate two-dimensional transform coefficient from the intermediate two-dimensional transform coefficients for the adjacent block, the current intermediate two-dimensional transform coefficient from the intermediate two-dimensional transform coefficients for the adjacent block spatially corresponding to the current row from the two-dimensional transform coefficients for the adjacent block and a current column from the two-dimensional transform coefficients for the adjacent block:
      in response to the determination that the block boundary corresponds with the left edge of the current block, determining the current intermediate two-dimensional transform coefficient from the intermediate two-dimensional transform coefficients for the adjacent block by multiplying a corresponding two-dimensional transform coefficient from the two-dimensional transform coefficients for the adjacent block by the fraction of a difference between a right one-dimensional transform coefficient from a corresponding row from the right one-dimensional transform coefficients for the adjacent block and a left one-dimensional transform coefficient from a corresponding row from the left one-dimensional transform coefficients for the current block using alternating sign multiplication;
      in response to the determination that the block boundary corresponds with the right edge of the current block, determining the current intermediate two-dimensional transform coefficient from the intermediate two-dimensional transform coefficients for the adjacent block by multiplying the corresponding two-dimensional transform coefficient from the two-dimensional transform coefficients for the adjacent block by the fraction of a difference between a left one-dimensional transform coefficient from a corresponding row from the left one-dimensional transform coefficients for the adjacent block and a right one-dimensional transform coefficient from a corresponding row from the right one-dimensional transform coefficients for the current block;
      in response to the determination that the block boundary corresponds with the top edge of the current block, determining the current intermediate two-dimensional transform coefficient from the intermediate two-dimensional transform coefficients for the adjacent block by multiplying a corresponding two-dimensional transform coefficient from the two-dimensional transform coefficients for the adjacent block by the fraction of a difference between a bottom one-dimensional transform coefficient from a corresponding column from the bottom one-dimensional transform coefficients for the adjacent block and a top one-dimensional transform coefficient from a corresponding column from the top one-dimensional transform coefficients for the current block using alternating sign multiplication; and
      in response to the determination that the block boundary corresponds with the bottom edge of the current block, determining the current intermediate two-dimensional transform coefficient from the intermediate two-dimensional transform coefficients for the adjacent block by multiplying the corresponding two-dimensional transform coefficient from the two-dimensional transform coefficients for the adjacent block by the fraction of a difference between a top one-dimensional transform coefficient from a corresponding column from the top one-dimensional transform coefficients for the adjacent block and a bottom one-dimensional transform coefficient from a corresponding column from the bottom one-dimensional transform coefficients for the current block.

17. The decoder of claim 15, wherein the processor is configured to generate the partially reconstructed block data for the adjacent block by:
   generating partially reconstructed two-dimensional transform coefficients for the adjacent block based on the intermediate two-dimensional transform coefficients for the adjacent block and corresponding quantization thresholds; and
   including the partially reconstructed two-dimensional transform coefficients for the adjacent block in the partially reconstructed block data for the adjacent block.

18. The decoder of claim 11, wherein the processor is configured to perform transform coefficient continuity smoothing based on the two-dimensional transform coefficients for the current block from the encoded bitstream by:
   generating partially reconstructed two-dimensional transform coefficients for the current block based on the intermediate two-dimensional transform coefficients for the current block and corresponding quantization thresholds; and
   including the partially reconstructed two-dimensional transform coefficients in the reconstructed block data for the current block.

19. A method comprising:
   generating, by a processor executing instructions stored on a non-transitory computer-readable medium, a reconstructed frame by decoding an encoded bitstream, wherein decoding includes:
      obtaining encoded block data from the encoded bitstream, the encoded block data corresponding to a current block from the reconstructed frame and including two-dimensional transform coefficients for the current block;

generating reconstructed block data for the current block based on the encoded block data using transform coefficient continuity smoothing, wherein transform coefficient continuity smoothing includes:
for a block boundary of the current block:
in response to a determination that adjacent block data corresponding to an adjacent block spatially adjacent to the current block along the block boundary is available, performing transform coefficient continuity smoothing based on the current block, the adjacent block, and the block boundary, wherein performing transform coefficient continuity smoothing based on the current block and the adjacent block includes:
determining one-dimensional transform coefficients for the current block based on the block boundary and the two-dimensional transform coefficients for the current block; and
determining intermediate two-dimensional transform coefficients for the current block based on the two-dimensional transform coefficients for the current block and a difference between the one-dimensional transform coefficients for the current block and one-dimensional transform coefficients for the adjacent block; and
including the reconstructed block data in the reconstructed frame; and
outputting the reconstructed frame.

20. The method of claim 19, wherein transform coefficient continuity smoothing based on the two-dimensional transform coefficients for the current block from the encoded bitstream includes:
generating partially reconstructed two-dimensional transform coefficients for the current block based on the intermediate two-dimensional transform coefficients for the current block and corresponding quantization thresholds; and
including the partially reconstructed two-dimensional transform coefficients in the reconstructed block data for the current block.

* * * * *